April 26, 1960
M. H. STARK
2,933,988
TUBE BODY FORMING MECHANISM
Filed May 22, 1956
3 Sheets-Sheet 2
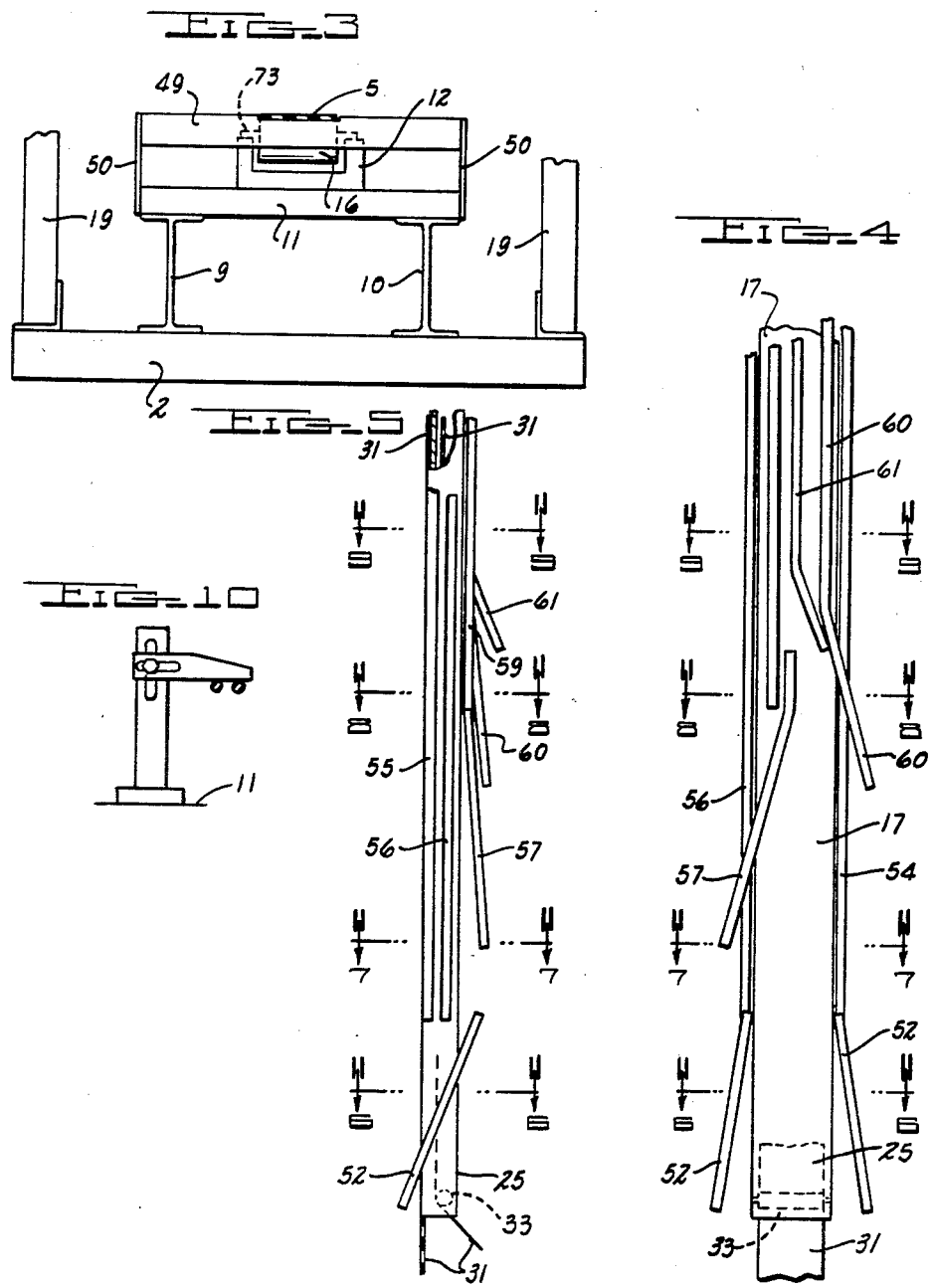
INVENTOR.
MARTIN H. STARK
BY
SMITH, OLSEN, LEWIS & MR
ATTORNEYS

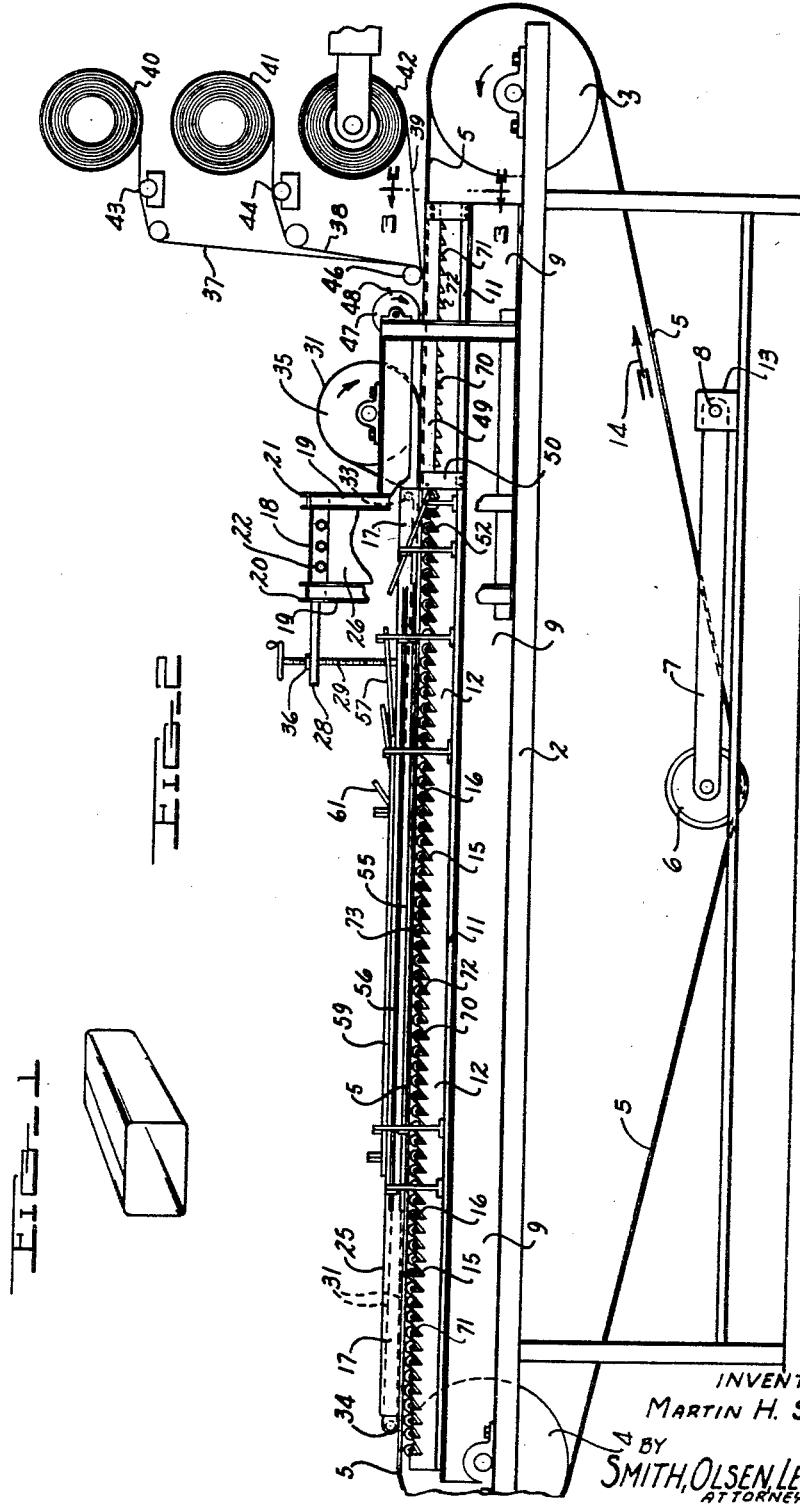

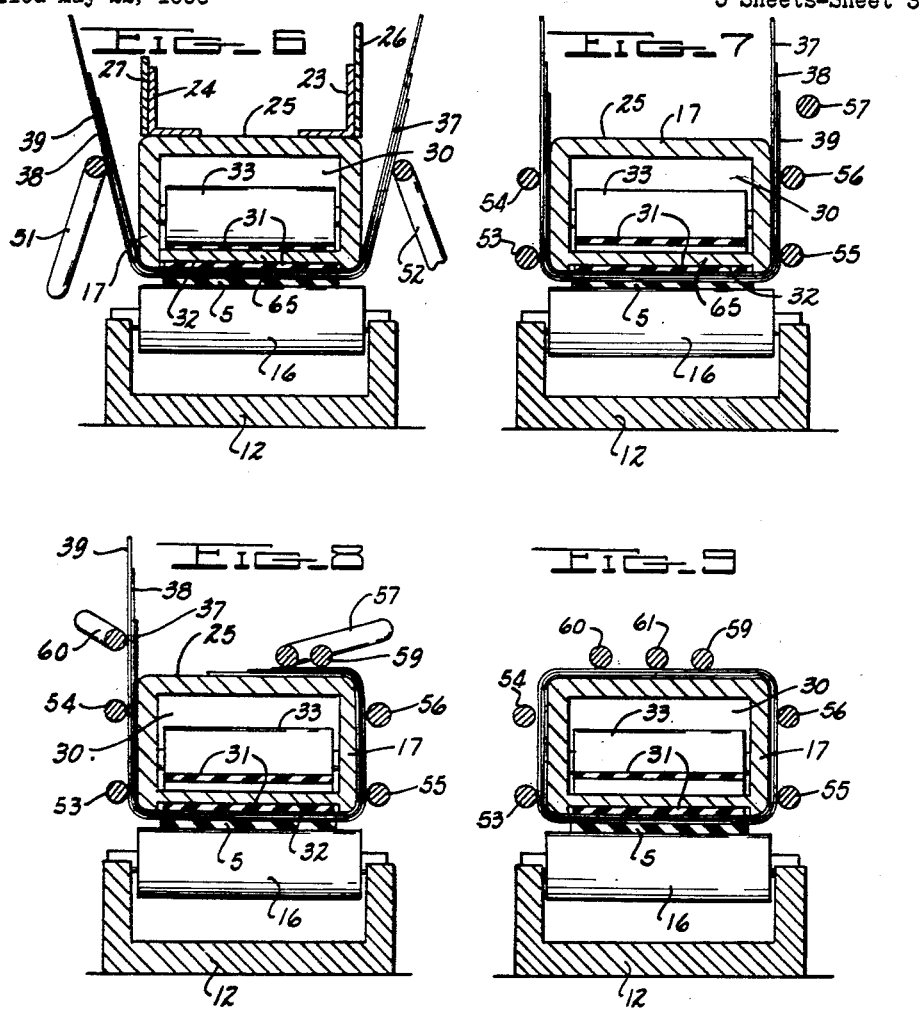

United States Patent Office 2,933,988
Patented Apr. 26, 1960

2,933,988

TUBE BODY FORMING MECHANISM

Martin Henry Stark, Saginaw, Mich.

Application May 22, 1956, Serial No. 586,526

4 Claims. (Cl. 93—82)

This invention relates to apparatus for forming tubes of the type which are employed in pasteboard containers, composite metal-pasteboard containers, containers lined with saran or other fluid impervious material, fiber drums, and other similar containers.

Objects of the invention are to provide a tube-forming apparatus wherein:

(1) Desired lining materials (as for example metal foil materials and plastic materials) may be easily incorporated into the tube during the tube-forming operation, (2) The lining materials (including barrier materials between plies) may if desired occupy any number of plies without being required to be wound up around all of tube body plies, as per the present convolute method; thereby enabling placement of the lining material in only the most advantageous positions so as to utilize a minimum amount of lining material for a given "lining" function, (3) High quantity tube production may be realized with a relatively low cost apparatus, (4) The apparatus includes a minimum number of reciprocating mechanisms, (5) The high production advantages of the conventional "spiral" apparatus are combined with the "tube body strength" advantages of the conventional "convolute" apparatus, (6) The formed tube may be made up of any number of plies, (7) The joints of adjacent plies may be staggered to provide a tube body of maximum strength, (8) The tube may be formed of various different cross sections, including round or rectangular; the conventional "spiral" apparatus can only be used to form round cross sectioned tubes, (9) The tube-forming materials may travel through the apparatus without danger of tearing, splitting, or otherwise breaking apart during the tube-forming operation,

(10) The tube-forming materials may travel through the apparatus without being subjected to rubbing, forces, sliding forces, or other similar frictional forces; thereby permitting the use of relatively thin, fragile materials as tube body materials, and

(11) The tube may be provided with a label sheet as the tube is being formed, and the label sheet may be printed as it is being introduced onto the tube body, thereby lowering production costs and handling costs incident to the labelling operation.

Other objects of this invention will appear in the following description and appended claims, reference being had to the accompanying drawings forming a part of this specification wherein like reference characters designate corresponding parts in the several views.

In the drawings:

Fig. 1 is a perspective view of a tube formed by one embodiment of the present invention.

Fig. 2 is an elevational view of one embodiment of the invention.

Fig. 3 is an end view taken on line 3—3 in Fig. 2.

Fig. 4 is an enlarged plan view of a mandrel and "sheet wrap around" means employed in the Fig. 1 embodiment, with certain support mechanisms removed for illustration purposes.

Fig. 5 is an elevational view of the Fig. 4 mechanism.

Fig. 6 is a sectional view on line 6—6 in Figs. 4 and 5.

Fig. 7 is a sectional view on line 7—7 in Figs. 4 and 5.

Fig. 8 is a sectional view on line 8—8 in Figs. 4 and 5.

Fig. 9 is a sectional view on line 9—9 in Figs. 4 and 5.

Figs. 6 through 9 are taken with the tube-forming material in the apparatus in order to show the "sheet wrap around" action. The other figures are taken with the tube-forming materials removed in order to better illustrate constructional details of the apparatus.

Fig. 10 is an elevational view of a standard utilized to support the "sheet wrap around" mechanisms.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a tube-forming apparatus including a table 2, on which are rotatably mounted two large diameter pulleys 3 and 4. An endless rubber belt 5 is trained around pulleys 3 and 4. The desired tension in belt 5 is maintained by a weight-forming pulley 6 rotatably mounted on an arm 7. Arm 7 is fixedly secured to a shaft 8 which is rotatably mounted in bracket means 13 on table 2. Pulley 3 is adapted to be driven by a power means (not shown) so as to move belt 5 in the arrow 14 direction.

Table 2 supports two elongated I-beams 9 and 10 (Fig. 3), and these I-beams in turn support an elongated platform 11. Fixedly positioned on platform 11 is a channel member 12. Portions of member 12 are notched out, as at 15, to provide bearing support for a series of closely spaced rollers 16. Rollers 16 provide a frictionless subsurface for belt 5 so as to give it a smooth, uniform travel beneath elongated mandrel 17. Notches 15 provide intersecting vertical and angularly inclined surfaces 70 and 71. A rubber block 72 is positioned on each of surfaces 71, and the roller axle 73 is supported between block 72 and surface 70. Blocks 72 provide resilient mountings for the rollers; whereby to cooperate with screw 29 in maintaining a desired pressure of the belts on the sheet material at all points along the mandrel length.

Mandrel 17 is cantileveringly suspended from a superstructure 18. Superstructure 18 includes four channel members 19 (only two of which are visible in Fig. 2, the other two being directly behind the visible members). Opposed ones of channels 19 are connected together by horizontal channels 20 and 21. Two parallel angle irons 22 interconnect channels 20 and 21, and two other angle irons 23 and 24 (see Fig. 6) are fixed against the upper face 25 of mandrel 17. Angle irons 22 and 23, 24 are interconnected by two vertical plates 26 and 27 (see Fig. 6). Between angle irons 22 there extends a channel iron 28, and threadedly extending through channel iron 28 into a rotatable anchorage in mandrel 17 is a manually rotatable screw 29. Screw 29 cooperates with plates 26, 27 to stabilize mandrel 17 in desired position above belt 5. A nut 36 holds screw 29 in an adjusted position. The adjustment of screw 29 should be such that the tube-forming material moves smoothly along the mandrel. If the screw is tightened down too far the sheet material tends to "pinch" between belts and not be carried along the mandrel. If the screw is not tightened down enough the material tends to slip between the belt surfaces.

Mandrel 17 is interiorly hollowed out along its entire length to provide a passageway 30 for the "upper run" travel of an endless rubber belt 31. The lower face of mandrel 17 is recessed for its entire length to provide a giude way 32 for belt 31 during its "lower run" of travel. By positioining belt 31 in guideway 32 the belt does not project beyond the lower face of mandrel 17 such as to cause a "hump" or "bump" in the formed tube (see Figs. 6 through 9). If desired wall 65 (which forms guideway 32) could be replaced by a plurality of closely spaced rollers to provide a surface similar to that provided by rollers 16. The ends of mandrel 17 are provided with rollers 33 and 34 for the guiding of belt 31, and a power driven pulley or drum 35 is provided for driving belt 31 along the mandrel. Drum 35 may be driven from the same power means as pulley 3 through power transmitting means (not shown), or drum 35 may be driven from a separate power means. In any case the speed of belt 31 should be so synchronized with that of belt 5 as to drive the tube-forming material through the apparatus without the occurrence of any rubbing forces or frictional forces as would stress, wrinkle or tear apart the tube-forming materials. It is contemplated that the tube-forming materials may include such thin, fragile, wrinkable materials as heat sealable polyethylene, saran, Pliofilm, and unsupported metal foil (i.e. foil without a backing sheet); hence the desirability of maintaining synchronized belt speeds. In practice one of the belts may travel very slightly faster than the other in order to insure a good drive to the sheet material without danger that the sheet material will lag due to a "floating" condition such as might be caused by operating both belts at the same speed.

Any number of sheets may be incorporated into the formed tube. For illustrative purposes, in Fig 2 there are shown three sheets, numbered 37, 38 and 39. These sheets or webs are conveniently introduced from supply rolls 40, 41 and 42. Sheets 37 and 38 proceed over glue rollers 43 and 44 before their introduction beneath guide roller 46. It is contemplated that sheet 39 (which forms the outermost ply of the tube) could be passed over a printing roller (not shown) prior to its introduction into the space beneath roller 46, in which case sheet 39 would function as a "label" sheet. The various sheets may be formed of any bendable or flexible material, as for example pasteboard, metal foil, polyethylene sheets and Pliofilm sheets. The type or character of the "glue" or adhesive employed on rollers 43 and 45 may be varied in accordance with the type of sheet materials being ememployed to form the tube.

It will be noted from Figs. 6 through 9 that sheets 37, 38 and 39 are staggered laterally (i.e. in directions at right angles to the axis of mandrel 17). This lateral staggering of sheets 37, 38 and 39 is achieved by displacing supply rolls 40, 41 and 42 laterally. This lateral staggering is beneficial in that the joints of the various plies are staggered (see Fig. 9) so as to form a comparatively strong tube.

After sheets 37, 38 and 39 pass beneath roller 46 they encounter a rotary cutter 47 which is equipped with a cutter blade 48. Cutter 47 rotates in synchronism with the motion of belt 5 so as to cut the superimposed sheets into predetermined lengths in accordance with the desired tube length. Cutter 47 may conveniently be rotated by the same power source as pulley 3.

In order to support sheets 37, 38 and 39 in a flat condition for cutting by blade 48, sheets 37, 38 and 39 are initially introduced onto a table 49. Bracket arms 50 support table 49 so that its upper surface is at or slightly below the upper surface of belt 5 (see Fig. 3). Table 49 serves as a "backing" member to ensure a clean cut through the sheets.

As the severed sheets are fed beneath the mandrel they encounter two deflector rods 51 and 52 which force the sheets upwardly along the side faces of mandrel 17 as indicated in Fig. 6. The sheets are held in positions against the mandrel side faces by horizontal rods 53, 54, 55 and 56.

Continued movement of the severed sheets causes them to contact a deflector rod 57 and be wrapped around a portion of mandrel surface 25 as indicated in Fig. 8. A rod 59 maintains the sheets in position against surface 25.

Further movement of the several sheets causes the opposite (or upstanding) edges of the sheets to encounter rod 60 so as to be deflected toward surface 25. Rod 61 cooperates with rod 60 to ensure a smooth wrap around action to the Fig. 9 position. Rods 53, 54, 55, 56, 59, 60 and 61 are continued horizontally in a downstream direction to maintain the formed tube in its Fig. 9 condition and enable a correct setting of the adhesive between adjacent plies. A heater mechanism (not shown) may be employed to cure or set the adhesive while the sheets are still on the mandrel. In some cases certain of the sheets may be formed of "heat sealable" materials in which event a separate adhesive is not necessary.

It will be noted that the joints in each ply are "butt" joints, i.e. the edges of the sheets abut against each other in the same plane. It is contemplated however that "overlapping" joints can be employed if desired.

The illustrated apparatus combines the high production characteristics of the conventional "spiral" apparatus with the "tube body strength" characteristics of the "convolute" apparatus. In the conventional spiral apparatus the tube plies are introduced onto a fixed mandrel at an angle to the mandrel axis so as to "spiral" around the mandrel during the tube-forming operation. Tubes formed on the spiral apparatus do not possess high strength characteristics. In the conventional "convolute" method each tube-component sheet is mechanically wrapped around a rotating mandrel, and subsequently stripped therefrom. The convolute apparatus is not adapted for high speed production or economical incorporation of lining materials during the tube-forming operation (due to the fact that the linings—which are sometimes costly materials—would necessarily be wound up between successive tube plies).

One feature of the present invention lies in the fact that the sheets are severed to length before being wrapped around the mandrel. As a result there is no danger that the sheets will tear or split at right angles to the mandrel axis, as might be the case if it were attempted to bend a long web of material around the mandrel without first cutting it to length.

I claim:

1. Tube forming mechanism comprising an elongated hollow mandrel; rollers adjacent opposite ends of said mandrel; a first endless belt trained around the rollers, said belt running through the mandrel's hollow interior and along one of the mandrel's exterior faces, the mandrel and first belt providing a cross section corresponding to the internal dimension of the formed tube; a second belt running parallel to and adjacent the first belt; means for driving said belts; and deflector means positioned along the mandrel whereby when sheet material is fed into the space between the belts and advanced along the mandrel the sheet material is caused to be wrapped around the mandrel into a tube by the action of the deflector means; said deflector means taking the form of two members converging toward one another and away from the belts in downstream directions, a third deflector member downstream from the first two deflector members, said third deflector member extending in a downstream direction from a point outside and above the mandrel downwardly and inwardly toward the upper face of the mandrel, and a fourth deflector member downstream from the third deflector member, said fourth deflector member extending in a downstream direction from a second point outside and above the mandrel downwardly and inwardly toward the upper face of the mandrel, said fourth deflector member lying on the side of the mandrel vertical center line opposite the third deflector member; and means supporting each of the deflector members for individual adjustments in directions at right angles to the mandrel axis.

2. Tube forming mechanism comprising an elongated hollow mandrel; rollers adjacent opposite ends of said mandrel; a first endless belt trained around the rollers, said belt running through the mandrel's hollow interior and along one of the mandrel's interior faces, the mandrel and first belt providing a cross section corresponding to the internal dimension of the formed tube; a second belt running parallel to and adjacent the first belt; means for driving said belts; and deflector means positioned along the mandrel whereby when sheet material is fed into the space between the belts and advanced along the mandrel the sheet material is caused to be wrapped around the mandrel into a tube by the action of the deflector means; said deflector means taking the form of two members converging toward one another and away from the belts in downstream directions, a third deflector member downstream from the first two deflector members, said third deflector member extending in a downstream direction from a point outside and above the mandrel downwardly and inwardly toward the upper face of the mandrel, and a fourth deflector member downstream from the third deflector member, said fourth deflector member extending in a downstream direction from a second point outside and above the mandrel downwardly and inwardly toward the upper face of the mandrel, said fourth deflector member lying on the side of the mandrel vertical center line opposite the third deflector member; and means supporting each of the deflector members for individual adjustments in directions at right angles to the mandrel axis, said supporting means for each deflector member including a standard having a vertical slot, a deflector means carrier arm having a horizontal slot, and a clamping bolt extending through the slots to hold the arm in adjusted positions on the standard.

3. Tube forming mechanism comprising an elongated hollow mandrel; rollers adjacent opposite ends of said mandrel; a first endless belt trained around the rollers, said belt running through the mandrel's hollow interior and along one of the mandrel's exterior faces, the mandrel and first belt providing a cross section corresponding to the internal dimension of the formed tube; a second belt running parallel to and adjacent the first belt; means for driving said belts; and deflector means positioned along the mandrel whereby when sheet material is fed into the space between the belts and advanced along the mandrel the sheet material is caused to be wrapped around the mandrel into a tube by the action of the deflector means; the second belt being supported on a support structure comprising two parallel walls extending along opposite lateral edges of said second belt, a plurality of closely spaced notches formed in each of said walls to provide intersecting vertical and angularly inclined surfaces, a rubber block positioned on each of the inclined surfaces, a plurality of closely spaced rollers positioned between the parallel walls, and axles for the rollers extending into opposite ones of the notches and supported on the rubber blocks.

4. Tube forming mechanism comprising an elongated hollow mandrel having a guide element adjacent each of its ends; first belt means running through the mandrel hollow interior, over the guide elements and along one of the mandrel exterior faces to define a traveling conveyor surface; second belt means running parallel to and adjacent said traveling conveyor surface to define a second traveling conveyor surface; deflector means positioned along the mandrel exterior; power means for driving said first and second belt means at approximately the same speeds, whereby when sheet material is fed into the space between said traveling conveyor surfaces it is caused to be wrapped around the mandrel into a tube by the action of the deflector means; means resiliently supporting said second belt means to maintain pressure engagement between the sheet material and conveyor surfaces; said support means comprising a series of closely spaced rollers engaged with said second belt means, and resilient means urging each of the rollers in the direction of the second belt means to provide the resilient support.

References Cited in the file of this patent

UNITED STATES PATENTS

| | | |
|---|---|---|
| 1,868,871 | Bergstein | July 26, 1932 |
| 1,986,857 | Roberts et al. | Jan. 8, 1935 |
| 2,256,263 | Haycock | Sept. 16, 1941 |
| 2,584,855 | Fergnani | Feb. 5, 1952 |
| 2,828,239 | Fischer | Mar. 25, 1958 |

UNITED STATES PATENT OFFICE
CERTIFICATE OF CORRECTION

Patent No. 2,933,988                                      April 26, 1960

Martin Henry Stark

It is hereby certified that error appears in the printed specification of the above numbered patent requiring correction and that the said Letters Patent should read as corrected below.

Column 4, line 9, for "several" read --- severed ---.

Signed and sealed this 18th day of October 1960.

(SEAL)
Attest:
KARL H. AXLINE
Attesting Officer

ROBERT C. WATSON
Commissioner of Patents